(12) United States Patent
Miura et al.

(10) Patent No.: US 10,082,205 B2
(45) Date of Patent: Sep. 25, 2018

(54) ABNORMALITY DETERMINING APPARATUS FOR VEHICLE HYDRAULIC CIRCUIT

(71) Applicant: TOYOTA JIDOSHA KABUSHIKI KAISHA, Toyota-shi, Aichi-ken (JP)

(72) Inventors: Takashi Miura, Nisshin (JP); Tomohiro Chinbe, Kariya (JP); Shuji Toyokawa, Toyota (JP); Tomohiro Asami, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/307,507

(22) PCT Filed: May 8, 2015

(86) PCT No.: PCT/IB2015/000864
§ 371 (c)(1),
(2) Date: Oct. 28, 2016

(87) PCT Pub. No.: WO2015/173635
PCT Pub. Date: Nov. 19, 2015

(65) Prior Publication Data
US 2017/0059038 A1    Mar. 2, 2017

(30) Foreign Application Priority Data

May 13, 2014  (JP) .................................. 2014-100022

(51) Int. Cl.
*F16H 61/12* (2010.01)
*G07C 5/08* (2006.01)
(Continued)

(52) U.S. Cl.
CPC ....... *F16H 61/12* (2013.01); *B60W 30/18018* (2013.01); *B60W 50/0205* (2013.01);
(Continued)

(58) Field of Classification Search
CPC ................. F16H 61/12; F16H 61/0031; F16H 2061/1208; F16H 2061/1264;
(Continued)

(56) References Cited

U.S. PATENT DOCUMENTS

2002/0019691 A1  2/2002  Matsubara et al.
2002/0151408 A1* 10/2002  Nishina ................... F16H 61/12
                                                        477/34
2016/0096518 A1*  4/2016  Li ........................... F16H 61/12
                                                        701/112

FOREIGN PATENT DOCUMENTS

JP    2002-115579 A    4/2002
JP    2009-108923 A    5/2009

* cited by examiner

*Primary Examiner* — Brian P Sweeney
(74) *Attorney, Agent, or Firm* — Oliff PLC

(57) ABSTRACT

There is provided an abnormality determining apparatus for a hydraulic circuit of a vehicle including: a torque converter; a hydraulic clutch; a mechanically-driven hydraulic pump (14); an electrically-driven hydraulic pump (16); and a solenoid valve. The abnormality determining apparatus includes an electronic control unit configured to determine which of the electrically-driven hydraulic pump and the solenoid valve has an abnormality, and configured to determine that the electrically-driven hydraulic pump has an abnormality when a turbine speed of the torque converter becomes equal to or higher than a first determination value within a prescribed period of time from rise-up of an engine speed, and determine that the solenoid valve has an abnormality when the turbine speed becomes equal to or higher than a second determination value higher than the first determination value, after a lapse of the prescribed period of time.

6 Claims, 5 Drawing Sheets

(51) Int. Cl.
*B60W 30/18* (2012.01)
*F16H 61/00* (2006.01)
*B60W 50/02* (2012.01)

(52) U.S. Cl.
CPC ....... F16H 61/0031 (2013.01); G07C 5/0808 (2013.01); *B60W 2050/022* (2013.01); *B60W 2510/1015* (2013.01); *F16H 2061/1208* (2013.01); *F16H 2061/1264* (2013.01); *F16H 2061/1268* (2013.01)

(58) Field of Classification Search
CPC ......... F16H 2061/1268; G07C 5/0808; B60W 30/18018; B60W 50/0205; B60W 2050/022; B60W 2510/1015
USPC ........................................................ 701/29.2
See application file for complete search history.

| LEVER POSITION | GEAR STEP | SL1 | SL2 | ... | C1 | C2 | ... |
|---|---|---|---|---|---|---|---|
| D | 1ST | YES | NO | NO | YES | NO | NO |
| | 2ND | ... | ... | ... | ... | ... | ... |
| | ... | ... | ... | ... | ... | ... | ... |

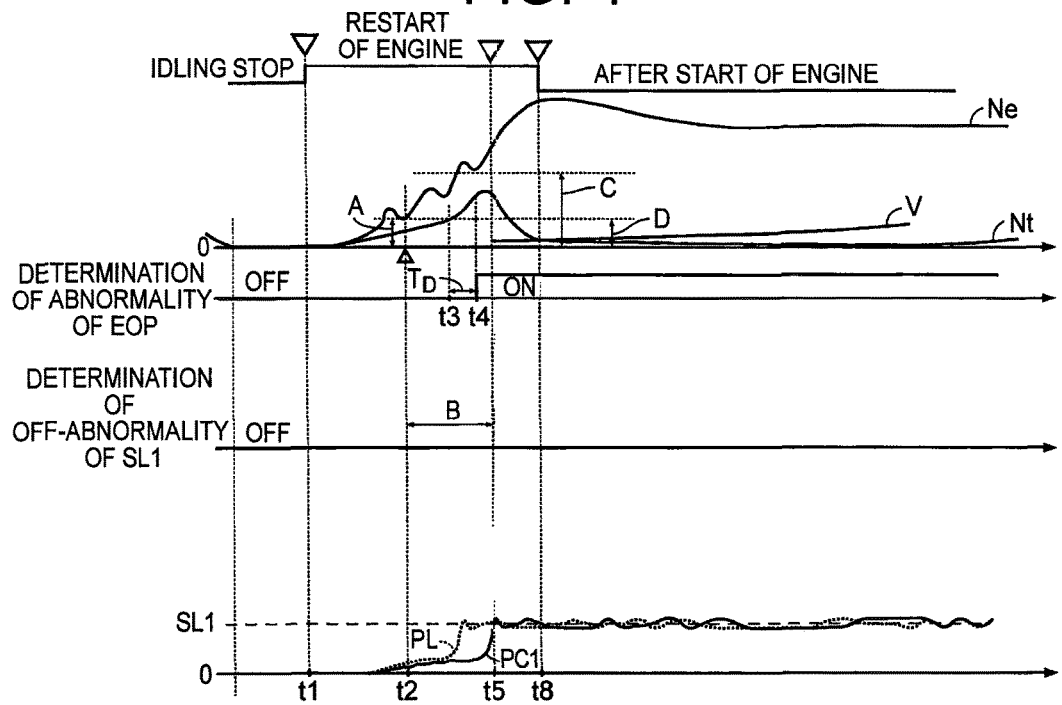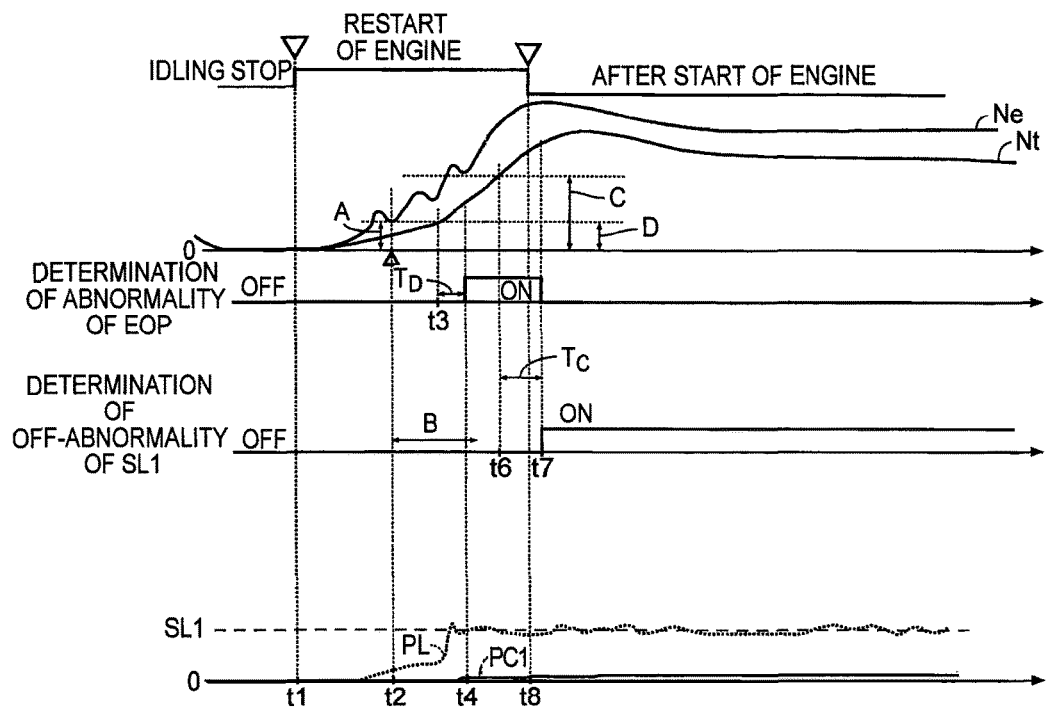

ABNORMALITY DETERMINING APPARATUS FOR VEHICLE HYDRAULIC CIRCUIT

BACKGROUND OF THE INVENTION

1. Field of the Invention

The invention relates to a technique of identifying which of an electrically-driven hydraulic pump and a solenoid valve is malfunctioning when an abnormality of the power transmitting state is detected, without increasing the number of components.

2. Description of Related Art

There is known a vehicle including a torque converter, a hydraulic clutch, a mechanically-driven hydraulic pump, an electrically-driven hydraulic pump, and a solenoid valve. The torque converter is disposed between an engine and an automatic transmission. The hydraulic clutch is disposed in the automatic transmission. The mechanically-driven hydraulic pump is driven by the engine. The electrically-driven hydraulic pump is driven electrically. The solenoid valve controls the operation of the hydraulic clutch using the discharge pressures from the mechanically-driven hydraulic pump and the electrically-driven hydraulic pump as source pressures, or using the discharge pressure from the mechanically-driven hydraulic pump as a source pressure. There is also known a technique of automatically stopping an engine when a vehicle stops travelling, and starting the engine using a starter in response to a starting operation, thereby enabling the vehicle to start travelling. Further, there has been proposed provision of an abnormality determining apparatus that determines whether or not there is an abnormality in the power transmitting state due to a malfunction of a hydraulic circuit of the vehicle. An example of such an abnormality determining apparatus for a vehicle hydraulic circuit is described in Japanese Patent Application Publication No. 2002-115579 (JP 2002-115579 A).

The abnormality determining apparatus for a vehicle hydraulic circuit in JP 2002-115579 A includes transmitting state determining means and output limiting means. When an engine is started in a state where power is transmittable from the input side to the output side of an automatic transmission due to the discharge pressure from an actuated electrically-driven hydraulic pump, the transmitting state determining means determines whether the power transmitting state such as the operation controlled state of a hydraulic clutch is normal or abnormal based on, for example, the difference between the turbine speed of a torque converter (input rotational speed) and the output rotational speed of the automatic transmission. When the transmitting state determining means determines that the power transmitting state is abnormal, the output limiting means decreases the engine output torque or limits an increase in the engine output torque. This reduces occurrence of a shock due to an abrupt power transmission at the time of actuation of the mechanically-driven hydraulic pump in the case where the power transmitting state is determined to be abnormal.

Possible causes of an abnormality in a vehicle hydraulic circuit include a malfunction of a solenoid valve that adjusts the engagement pressure to be supplied to a hydraulic clutch (starting clutch), and a malfunction of an electrically-driven hydraulic pump that serves as a hydraulic pressure source of the hydraulic fluid pressure to be supplied to the solenoid valve. However, the abnormality determining apparatus for a vehicle hydraulic circuit in JP 2002-115579 A includes the means for determining whether or not there is an abnormality in the power transmitting state, but does not include any means for identifying a malfunctioning component that is a cause of the abnormality.

Therefore, hydraulic pressure detection sensors that detect actual hydraulic pressures may be provided downstream of the electrically-driven hydraulic pump and the solenoid valve. Then, which of the electrically-driven hydraulic pump and the solenoid valve is malfunctioning may be identified by measuring the discharge pressure from the electrically-driven hydraulic pump and the supply pressure to be supplied from the solenoid valve to the hydraulic clutch. However, providing such hydraulic pressure detection sensors increases the number of components, resulting in an increase in the production cost.

SUMMARY OF THE INVENTION

The invention provides an abnormality determining apparatus for a vehicle hydraulic circuit, the abnormality determining apparatus being able to identify which of an electrically-driven hydraulic pump and a solenoid valve is malfunctioning when there is an abnormality in the power transmitting state, without increasing the number of components.

An aspect of the invention relates to an abnormality determining apparatus for a hydraulic circuit of a vehicle. The vehicle includes: a torque converter disposed between an engine and an automatic transmission; a hydraulic clutch disposed in the automatic transmission; a mechanically-driven hydraulic pump driven by the engine; an electrically-driven hydraulic pump electrically driven; and a solenoid valve configured to control operation of the hydraulic clutch using discharge pressures from the mechanically-driven hydraulic pump and the electrically-driven hydraulic pump as source pressures, or using a discharge pressure from the mechanically-driven hydraulic pump as a source pressure. The abnormality determining apparatus includes an electronic control unit configured to determine which of the electrically-driven hydraulic pump and the solenoid valve has an abnormality. The electronic control unit is configured to determine that the electrically-driven hydraulic pump has an abnormality when a condition i) is satisfied, and to determine that the solenoid valve has an abnormality when a condition ii) is satisfied: i) a turbine speed of the torque converter becomes equal to or higher than a first determination value within a prescribed period of time from rise-up of a speed of the engine, and ii) the turbine speed becomes equal to or higher than a second determination value that is higher than the first determination value, after a lapse of the prescribed period of time.

With the abnormality determining apparatus according to the above aspect of the invention, it is determined that the electrically-driven hydraulic pump has an abnormality when the turbine speed of the torque converter becomes equal to or higher than the first determination value within the prescribed period of time from rise-up of the speed of the engine, whereas it is determined the solenoid valve has an abnormality when the turbine speed becomes equal to or higher than the second determination value that is higher than the first determination value, after a lapse of the prescribed period of time. Thus, the abnormality determining apparatus according to the above aspect of the invention makes it possible to identify which of the electrically-driven hydraulic pump and the solenoid valve is malfunctioning, without increasing the number of components.

In the abnormality determining apparatus according to the above aspect of the invention, starting of the engine may be a restart of the engine after automatic stop control ends. The automatic stop control is control of automatically stopping the engine when the vehicle stops moving. Thus, it is possible to identify which of the electrically-driven hydraulic pump and the solenoid valve is malfunctioning each time a prescribed period of time elapses after the restart of the engine that follows the stop of the engine due to execution of the automatic stop control.

In the abnormality determining apparatus according to the above aspect of the invention, the electrically-driven hydraulic pump and the solenoid valve may be operated to engage the hydraulic clutch at least during starting of the engine. During starting of the engine, the discharge pressure from the mechanically-driven hydraulic pump may be insufficient as a source pressure for actuating the hydraulic clutch. Thus, during starting of the engine, the discharge pressure from the electrically driven electrically-driven hydraulic pump is supplied as a source pressure for engaging the hydraulic clutch. Thus, it is determined whether the electrically-driven hydraulic pump has an abnormality based on whether the turbine speed of the torque converter becomes equal to or higher than the first determination value within the prescribed period of time from rise-up of the speed of the engine.

In the abnormality determining apparatus according to the above aspect of the invention, the prescribed period of time may be a predetermined period of time required for a discharge pressure from the mechanically-driven hydraulic pump to reach an engagement pressure high enough for the hydraulic clutch to be engaged. Thus, within a period of time from the rise-up of the engine speed to a time at which the first clutch is allowed be engaged only by the discharged pressure from the mechanically-driven hydraulic pump, it is determined whether or not the electrically-driven hydraulic pump has an abnormality. Thus, it is possible to enhance the accuracy of determination as to whether the electrically-driven hydraulic pump has an abnormality.

In the abnormality determining apparatus according to the above aspect of the invention, the hydraulic clutch may be a starting clutch to be engaged to achieve first gear of the automatic transmission. Thus, when any one of the electrically-driven hydraulic pump, which serves as a hydraulic pressure source of engagement pressure for engaging the hydraulic clutch, and the solenoid valve, which controls the operation of the hydraulic clutch, is malfunctioning, first gear of the automatic transmission is not achieved. As a result, the engine output torque is not transmitted to the automatic transmission via a turbine shaft. This causes the turbine speed of the torque converter to abnormally increase (i.e., this causes racing of the turbine). Thus, it is possible to identify which of the electrically-driven hydraulic pump and the solenoid valve is malfunctioning based on the turbine speed.

In the abnormality determining apparatus according to the above aspect of the invention, the electrically-driven hydraulic pump may include an electromagnetic valve that adjusts an output pressure and the output pressure may be directly supplied to the hydraulic clutch. With the vehicle hydraulic circuit configured as described above, the engine is restarted after the stop of the engine due to execution of the automatic stop control. As a result, the vehicle is allowed to start moving.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a timing chart illustrating variations in the engine speed, the turbine speed, the vehicle speed, the result of the electrically-driven hydraulic pump abnormality determination, the result of the linear solenoid valve OFF-abnormality determination, and the hydraulic pressure from the linear solenoid valve, which are observed during automatic stop control, during a restart of an engine and after starting of the engine, when an electrically-driven hydraulic pump in a vehicle in FIG. 1 has an abnormality;

FIG. 5 is a timing chart illustrating variations in the engine speed, the turbine speed, the result of the electrically-driven hydraulic pump abnormality determination, the result of the linear solenoid valve OFF-abnormality determination, and the hydraulic pressure from the linear solenoid valve, which are observed during the automatic stop control, during a restart of the engine and after starting of the engine, when the linear solenoid valve in the vehicle in FIG. 1 has an OFF-abnormality;

DETAILED DESCRIPTION OF EMBODIMENTS

Hereinafter, an abnormality determining apparatus for a vehicle hydraulic circuit according to a first embodiment of the invention will be described with reference to the accompanying drawings.

Figure 1:
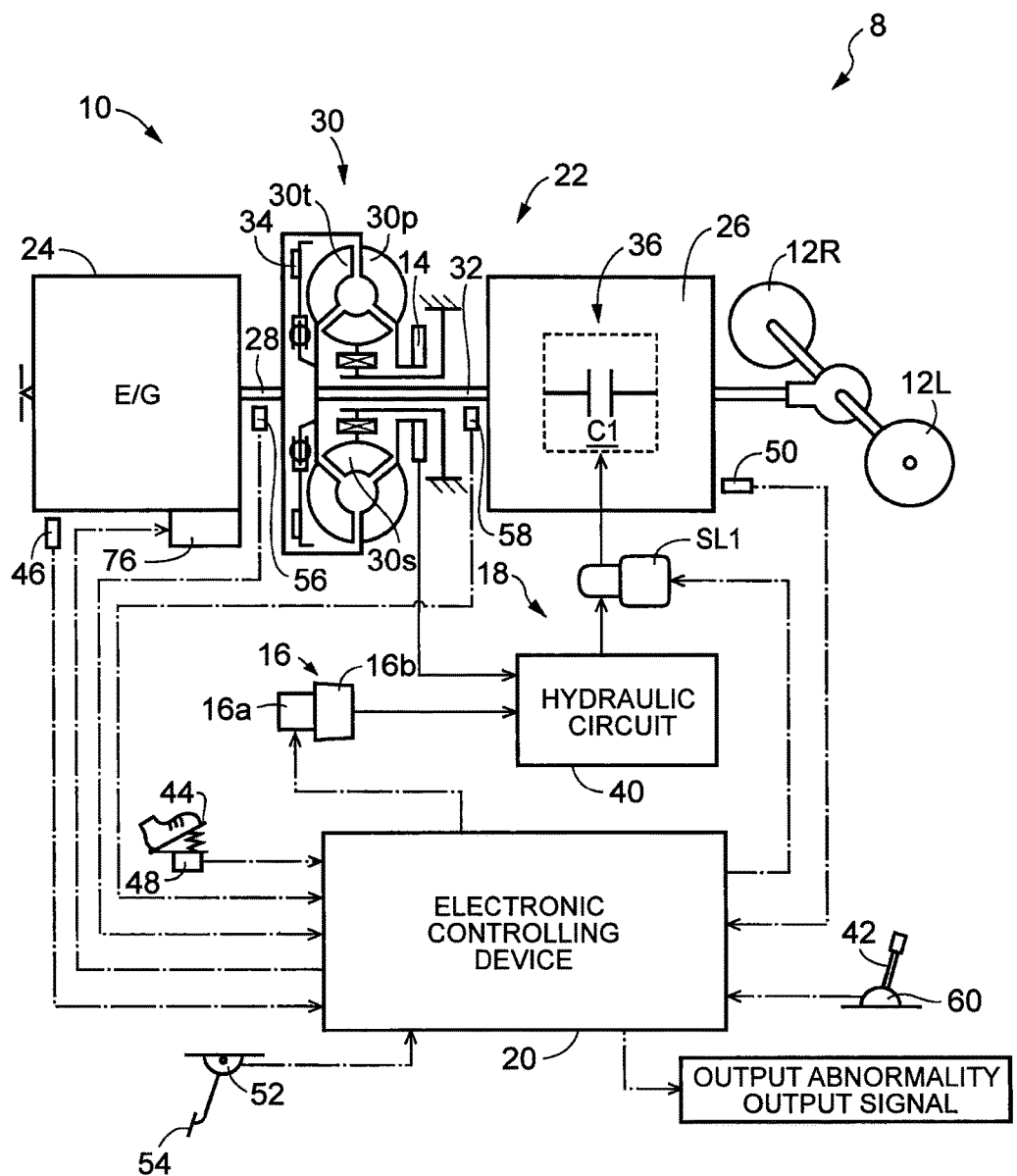
FIG. 1 is a schematic diagram of a vehicle driving apparatus according to a first embodiment of the invention.

FIG. 1 is a schematic diagram of a vehicle driving apparatus 10 included in a vehicle 8, to which the invention is applied. The vehicle 8 includes the vehicle driving apparatus 10, a pair of drive wheels 12R, 12L, a mechanically-driven hydraulic pump 14, an electrically-driven hydraulic pump 16, a hydraulic control circuit 18 and an electronic control unit 20. The vehicle driving apparatus 10 includes a vehicle power transmitting apparatus 22 (hereinafter, referred to as "power transmitting apparatus 22") and an engine 24. The power transmitting apparatus 22 is disposed between the engine 24 and the pair of drive wheels 12R, 12L. The power transmitting apparatus 22 includes an automatic transmission 26 and a torque converter 30. The torque converter 30 is connected to a crankshaft 28 of the engine 24 to be disposed between the engine 24 and the automatic transmission 26.

The torque converter 30 includes a pump impeller 30p connected to the crankshaft 28, which is an output shaft of the engine 24, a turbine impeller 30t connected to a turbine shaft 32, which is an input shaft of the automatic transmission 26, and a stator impeller 30s connected to a housing (transmission case) of the automatic transmission 26 via a one-way clutch. The torque converter 30 is a hydraulic power transmission device that transmits power generated by the engine 24 to the automatic transmission 26 using fluid. A lock-up clutch 34 is disposed between the pump impeller 30p and the turbine impeller 30t. The lock-up clutch 34 is a clutch configured to directly couple the pump impeller 30p and the turbine impeller 30t to each other. The lock-up clutch 34 is brought into an engaged state, a slip state, or a disengaged state through, for example, hydraulic control. When the lock-up clutch 34 is in the engaged state, more specifically, in the fully-engaged state, the pump impeller 30p and the turbine impeller 30t are rotated together with each other.

The automatic transmission 26 constitutes part of a power transmission path extending from the engine 24 to the pair of drive wheels 12R, 12L. The automatic transmission 26 outputs power generated by the engine 24 toward the drive wheels 12R, 12L. The automatic transmission 26 includes a plurality of hydraulic frictional engagement devices 36 including a plurality of planetary gear devices (not illustrated) and a first clutch C1. The automatic transmission 26 is a stepped transmission in which one of the multiple gears is selectively achieved by switching the engagement states of the multiple hydraulic frictional engagement devices 36. Gears of the automatic transmission 26 are changed by engaging an engagement device to be engaged for a gear change and disengaging an engagement device to be disengaged for the gear change. The first clutch C1, which is an example of a hydraulic clutch in the invention, is a starting clutch to be engaged to achieve first gear of the automatic transmission 26. Note that, in the drawings, only the first clutch C1 out of all the hydraulic frictional engagement devices 36 is illustrated, and illustration of the other hydraulic frictional engagement devices 36 is omitted.

The mechanically-driven hydraulic pump 14 is connected to the pump impeller 30p of the torque converter 30. The mechanically-driven hydraulic pump 14 is driven by the engine 24 via the pump impeller 30p, thereby discharging hydraulic fluid. Thus, when the engine 24 is stopped, the mechanically-driven hydraulic pump 14 is also stopped. Further, as an engine speed Ne (rpm) becomes higher, the hydraulic pressure output from the mechanically-driven hydraulic pump 14 becomes higher.

The electrically-driven hydraulic pump 16 is a hydraulic pump equipped with an electric motor, and includes an electric motor 16a and a hydraulic pump 16b that is driven by the electric motor 16a to supply discharge pressure. The mechanically-driven hydraulic pump 14 and the electrically-driven hydraulic pump 16 share the same hydraulic pressure supply destination, that is, the same hydraulic fluid supply destination. The hydraulic fluid supply destination is the hydraulic control circuit 18.

The hydraulic control circuit 18 includes a hydraulic circuit 40, a linear solenoid valve SL1, and other linear solenoid valves. The hydraulic circuit 40 includes a regulating valve (not illustrated) that regulates the hydraulic pressure of hydraulic fluid discharged from the mechanically-driven hydraulic pump 14 and the electrically-driven hydraulic pump 16 to a line pressure PL. The linear solenoid valve SL1 controls an engagement pressure PC1 for the first clutch C1 (hereinafter, referred to as "first clutch pressure PC1" where appropriate) using the line pressure PL as a source pressure. The other linear solenoid valves control engagement pressures for the other hydraulic frictional engagement devices 36. The linear solenoid valve SL1 regulates the line pressure PL supplied from the hydraulic circuit 40 based on a command from the electronic control unit 20, and applies the first clutch pressure PC1 to the first clutch C1. Similarly, the other linear solenoid valves of the hydraulic control circuit 18 supply hydraulic pressures such as a second clutch pressure PC2, which are obtained through pressure regulation performed based on commands from the electronic control unit 20, to the hydraulic frictional engagement devices 36 such as a second clutch C2 (not illustrated). The linear solenoid valve SL1 is an example of a solenoid valve in the invention.

Although there is a period of time during which the electrically-driven hydraulic pump 16 and the mechanically-driven hydraulic pump 14 are both driven, basically, one of the electrically-driven hydraulic pump 16 and the mechanically-driven hydraulic pump 14 is selectively driven. More specifically, when the engine 24 is at a standstill and when the engine 24 is being started, that is, when the mechanically-driven hydraulic pump 14 is not operated, the electrically-driven hydraulic pump 16 is electrically driven to engage the first clutch C1. After a lapse of a prescribed period of time that is required for the discharge pressure from the mechanically-driven hydraulic pump 14, which is driven by the engine 24, to reach an engagement pressure high enough for the first clutch C1 to be engaged, the operation of the electrically-driven hydraulic pump 16 is stopped.

Figures 2, 3:
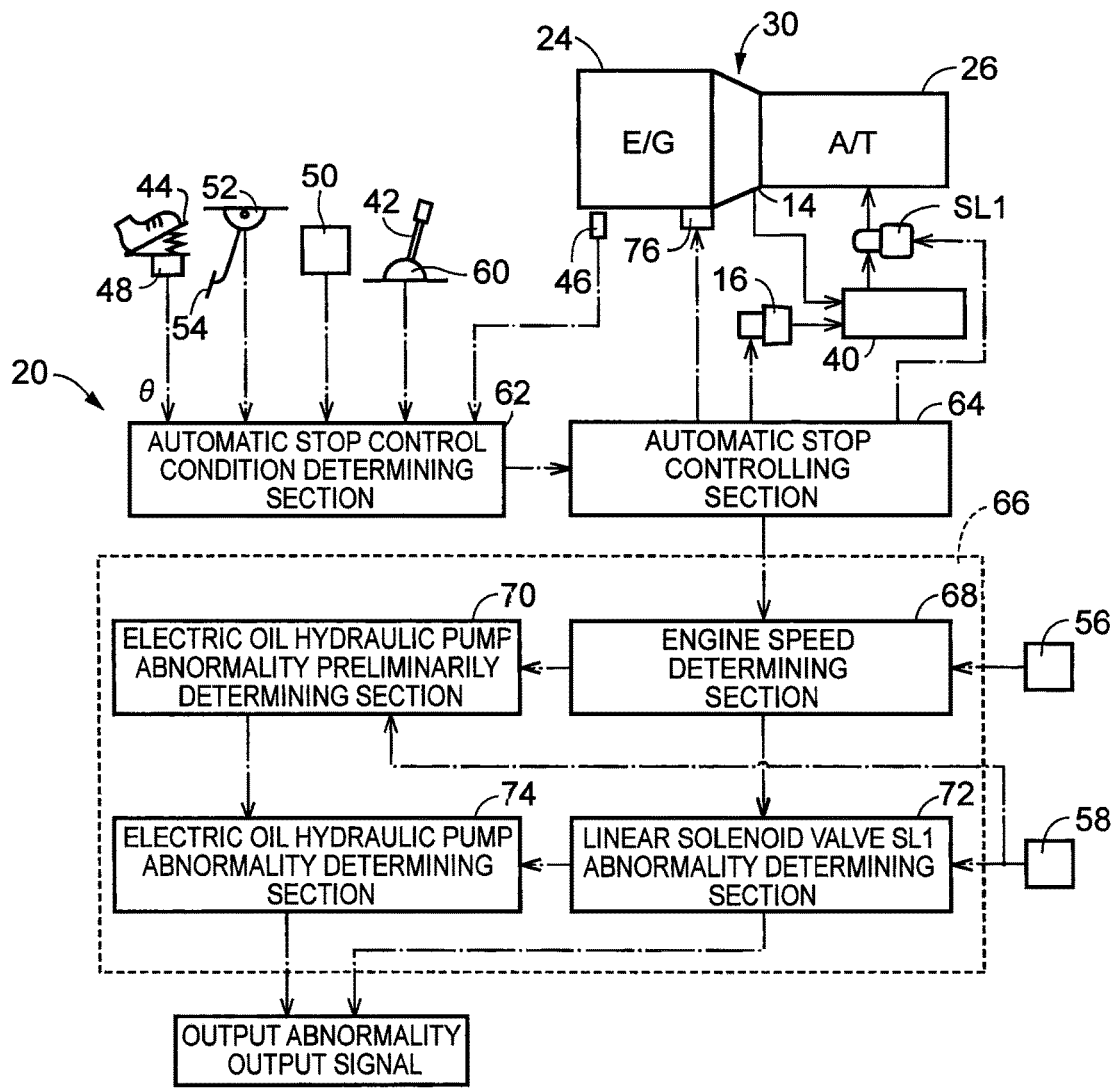
FIG. 2 is a table of an operation chart illustrating the relationship among the multiple gears of an automatic transmission in FIG. 1, the reach state indicating whether or not the clutch pressures supplied from linear solenoid valves reach the corresponding engagement pressures, and the engagement-disengagement states indicating whether frictional engagement devices are engaged or disengaged.
FIG. 3 is a functional block diagram illustrating main portions of the control functions of an electronic control unit.

FIG. 2 is a table of an operation chart illustrating the relationship among the multiple gears of the automatic transmission 26, the reach state indicating whether or not the clutch pressures supplied from the linear solenoid valves reach the corresponding engagement pressures, and the engagement-disengagement states indicating whether the frictional engagement devices are engaged or disengaged. Note that, "reached" for the linear solenoid valve SL1 indicates the state where the first clutch pressure PC1 supplied from the linear solenoid valve SL1 to the first clutch C1 has reached an engagement pressure high enough for the first clutch C1 to be engaged. On the other hand, "not reached" for, for example, the linear solenoid valve SL2 indicates the state where, for example, the second clutch pressure PC2 supplied from the linear solenoid valve SL2 to the second clutch C2 has not reached an engagement pressure high enough for the second clutch C2 to be engaged. Further, "engaged" for the first clutch C1 indicates that the first clutch C1 has been engaged, whereas "disengaged" for, for example, the second clutch C2 indicates that, for example, the second clutch C2 has been disengaged. That is, when the shift position of a shift lever 42 is in the "D" range, the vehicle speed V is zero and the accelerator operation amount Acc is zero, the first clutch C1 is engaged by the first clutch pressure PC1 from the linear solenoid valve SL1 and thus at least first gear ($1^{st}$) is achieved in the automatic transmission 26. Therefore, for example, when the electrically-driven hydraulic pump 16 or the linear solenoid valve SL1 is malfunctioning, an engagement pressure is not applied to the first clutch C1 and thus first gear is not achieved.

Referring again to FIG. 1, the electronic control unit 20 has the function as an engine controller that executes drive control of the engine 24 and the function as a gearshift controller that executes gearshift control of the automatic transmission 26. The electronic control unit 20 includes a so-called microcomputer, and executes vehicle control on, for example, the engine 24 and the automatic transmission 26 by executing signal processing according to programs stored in advance.

The electronic control unit 20 executes output control of the engine 24 based on, for example, the accelerator operation amount Acc (%), which is an operation amount of an accelerator pedal 44. Further, the electronic control unit 20 executes gearshift control of the automatic transmission 26 based on, for example, the accelerator operation amount Acc and the vehicle speed V (km/h). The electronic control unit 20 receives: a signal representing a temperature Toil of the hydraulic fluid that cools the engine 24 from an oil temperature sensor 46; a signal representing the accelerator operation amount Acc (%) from an accelerator operation amount sensor 48; a signal representing the vehicle speed V from a vehicle speed sensor 50; a signal representing whether or not a brake pedal 54 is depressed, which is detected by a foot brake switch 52; a signal representing an engine speed Ne (rpm) detected by an engine speed sensor 56; a signal representing a turbine speed Nt (rpm) detected by a turbine speed sensor 58; and a signal representing a position of the shift lever 42 detected by a shift position sensor 60. When the accelerator operation amount Acc is zero, the accelerator pedal operation amount is zero, that is, the accelerator pedal 44 is not depressed. The accelerator operation amount sensor 48 transmits a signal representing whether or not the accelerator pedal 44 is depressed, together with a signal representing the accelerator operation amount Acc (%).

The electronic control unit 20 transmits various output signals to the devices mounted in the vehicle 8. The electronic control unit 20 controls, for example, a throttle opening degree θth based on the accelerator operation amount Acc and according to a throttle opening degree characteristic, which is a predetermined relationship between the throttle opening degree θth and the accelerator operation amount Acc. The electronic control unit 20 also transmits a signal for controlling driving of the electrically-driven hydraulic pump 16, a signal for controlling starting of the engine 24, and a signal for controlling the operation of the linear solenoid valve SL1, that is, for controlling the first clutch pressure PC1 to be supplied to the first clutch C1.

The electronic control unit 20 executes abnormality determination within a prescribed period of time from when automatic stop control intended to improve, for example, the fuel efficiency, that is, so-called idle reduction control ends to restart the engine 24. The abnormality determination is executed to identify which of the electrically-driven hydraulic pump 16 and the linear solenoid valve SL1 is malfunctioning.

FIG. 3 is a functional block diagram illustrating main portions of the control functions of the electronic control unit 20. The electronic control unit 20 includes an automatic stop control condition determining unit 62 (hereinafter, referred to as "determining unit 62"), an automatic stop control unit 64, and an abnormality determining unit 66, as functional units. The abnormality determining unit 66 includes an engine speed determining unit 68, an electrically-driven hydraulic pump abnormality preliminarily determining unit 70, a linear solenoid valve SL1 abnormality determining unit 72, and an electrically-driven hydraulic pump abnormality determining unit 74.

The determining unit 62 determines whether or not an automatic stop control condition is satisfied. The automatic stop control condition is a prescribed condition for executing the automatic stop control for automatically and temporarily stopping the engine 24 when the vehicle 8 stops travelling. For example, the automatic stop control condition is composed of (i) a condition that the shift operation position of the shift lever 42, which is detected by the shift position sensor 60, is the operation position D (position D), (ii) a condition that the vehicle speed V detected by the vehicle speed sensor 50 is zero, or equal to or lower than a prescribed vehicle speed that is regarded as a value substantially equal to zero, (iii) a condition that depression of the brake pedal 54, that is, application of the brake, is detected by the foot brake switch 52, (iv) a condition that the accelerator operation amount Acc detected by the accelerator operation amount sensor 48 is zero, and (v) a condition that the temperature Toil of the hydraulic fluid for cooling the engine 24, which is detected by the oil temperature sensor 46, is within a range of temperatures indicating that the engine 24 has been warmed up but has not been overheated. When all the conditions (i) to (v) are satisfied, the determining unit 62 determines that the automatic stop control condition is satisfied. On the other hand, when at least one of the conditions (i) to (v) is unsatisfied, the determining unit 62 determines that the automatic stop control condition is not satisfied. For example, when the automatic stop control condition is satisfied, if the brake pedal 54 is released to release the brake that has been applied, that is, operation for applying brakes to the vehicle 8 is cancelled, the condition (iii) is no longer satisfied. Thus, the determining unit 62 makes a determination that the automatic stop control condition, which has been satisfied, is no longer satisfied.

When the determining unit 62 determines that the automatic stop control condition is satisfied, the automatic stop control unit 64 executes the automatic stop control. On the other hand, when the determining unit 62 determines that the automatic stop control condition is not satisfied, the automatic stop control unit 64 ends, that is, cancels the automatic stop control and transmits a signal to a starter motor 76 to rotate the crankshaft of the engine 24 (perform cranking), thereby restarting the engine 24.

When the automatic stop control is started, that is, when the determining unit 62 determines that the automatic stop control condition is satisfied, the automatic stop control unit 64 drives the electrically-driven hydraulic pump 16 and drives the linear solenoid valve SL1 to adjust the first clutch pressure PC1 to be supplied to the first clutch C1, to an engagement pressure high enough for the first clutch C1 to be engaged. The source pressure of the first clutch pressure PC1 is the hydraulic fluid pressure input into the linear solenoid valve SL1 as the electrically-driven hydraulic pump 16 is driven. When the determining unit 62 makes a determination that the automatic stop control condition, which has been satisfied, is no longer satisfied, the automatic stop control unit 64 cancels the automatic stop control to restart the engine 24 and drives the linear solenoid valve SL1 to adjust the first clutch pressure PC1 to an engagement pressure high enough for the first clutch C1 to be engaged. In this case, the source pressure of the first clutch pressure PC1 is the hydraulic fluid pressure PL. The hydraulic fluid pressure PL is generated by the mechanically-driven hydraulic pump 14 that is actuated in response to an increase in the engine speed Ne, and then the hydraulic fluid pressure PL is input into the linear solenoid valve SL1. During the restart of the engine 24, that is, during starting of the engine 24, which is a period from when the automatic stop control ends until when the linear solenoid valve SL1 becomes able to supply the engagement pressure for the first clutch C1 using the hydraulic fluid pressure PL from the mechanically-driven hydraulic pump 14 as the source pressure, the automatic stop control unit 64 keeps the electrically-driven hydraulic pump 16 driving in order to maintain the engagement pressure for the first clutch C1. In other words, the electrically-driven hydraulic pump 16 and the linear solenoid valve SL1 are operated in order to engage the first clutch C1 at least during starting of the engine 24.

The timing chart of the electrically-driven hydraulic pump (EOP) abnormality determination in FIG. 4 illustrates the result of determination as to whether the electrically-driven hydraulic pump 16 has an abnormality, which is made by the electrically-driven hydraulic pump abnormality determining unit 74. In the timing chart, "ON" denotes the state where the electrically-driven hydraulic pump 16 has an abnormality, whereas "OFF" denotes the state where the electrically-driven hydraulic pump 16 has no abnormality. The timing chart of the linear solenoid valve SL1 OFF-abnormality determination in FIG. 5 illustrates the result of determination as to whether the linear solenoid valve SL1 has an OFF-abnormality, which is made by the linear solenoid valve SL1 abnormality determining unit 72. Note that, an OFF-abnormality means an abnormal state where the first clutch pressure PC1 does not reach an engagement pressure for the first clutch C1 although the hydraulic fluid pressure PL from the mechanically-driven hydraulic pump 14 is supplied to the linear solenoid valve SL1 and a command to engage the first clutch C1 is issued. In the timing chart, "ON" denotes the state where the linear solenoid valve SL1 has an OFF-abnormality, whereas "OFF" denotes the state where the linear solenoid valve SL1 has no OFF-abnormality. In the timing charts of the hydraulic pressure of the linear solenoid valve SL1 in FIG. 4 and FIG. 5, the hydraulic pressure PL denotes the hydraulic fluid pressure supplied to the linear solenoid valve SL1 when the mechanically-driven hydraulic pump 14 serves as a hydraulic pressure source. Further, the hydraulic pressure PC1 is a first clutch pressure (forward clutch pressure) that is supplied from the linear solenoid valve SL1 to the first clutch C1. In addition, a broken line indicates an engagement pressure high enough for the first clutch C1 to be engaged when the discharge pressure from the mechanically-driven hydraulic pump 14 is used as a source pressure. Note that, the operation of the electrically-driven hydraulic pump 16, which is operated to engage the first clutch C1 during the automatic stop control and during the restart of the engine 24, is omitted in FIG. 4 and FIG. 5.

Upon reception of a signal to restart the engine 24 from the automatic stop control unit 64 (time t1), the engine speed determining unit 68 in the abnormality determining unit 66 determines whether or not the engine speed Ne is equal to or higher than a prescribed value A (rpm) that is empirically set in advance, based on the engine speeds Ne sequentially detected by the engine speed sensor 56. More specifically, the engine speed determining unit 68 determines whether or not the engine speed Ne has continued to be equal to or higher than the prescribed value A since the engine speed Ne reaches the prescribed value A (hereinafter, simply described as "the engine speed Ne has continued to be equal to or higher than the prescribed value A" where appropriate). That is, the time point at which the engine speed N2 has continued to be equal to or higher than the prescribed value A is an example of "rise-up of speed of the engine" in the invention. The prescribed value A corresponds to a threshold used in a rise-up determination on the engine speed Ne in the invention. The rise-up time of the engine speed Ne is time t2 in FIG. 4 and FIG. 5. During the engine restart from time t1 to time t8 in FIG. 4 and FIG. 5 is an example of "during starting of the engine" in the invention. At time t8, the engine speed Ne of the started engine 24 before the accelerator pedal 44 is depressed reaches a starting completion determination value (the maximum value in the FIG. 4 and FIG. 5).

In the case where the engine speed determining unit 68 determines that the engine speed Ne has continued to be equal to or higher than the prescribed value A, when the turbine speed Nt sequentially detected by the turbine speed sensor 58 has continued to be equal to or higher than a racing determination speed D (rpm), the electrically-driven hydraulic pump abnormality preliminarily determining unit 70 in the abnormality determining unit 66 executes preliminary determination as to whether the electrically-driven hydraulic pump 16 has an abnormality. Specifically, when the length of time that has elapsed since the rise-up time t2 of the engine speed N2 is shorter than a prescribed period of time B (sec), the electrically-driven hydraulic pump abnormality preliminarily determining unit 70 determines whether or not the turbine speed Nt has continued to be equal to or higher than the speed D for a period of time $T_D$ (sec). The period of time $T_D$ is used to determine whether or not racing of the turbine due to an abnormality in the electrically-driven hydraulic pump 14 continues. The prescribed period of time B is a period of time up to time t5 at which the hydraulic pressure PC1 output from the linear solenoid valve SL1 reaches an engagement pressure high enough for the first clutch C1 of the automatic transmission 26 to be engaged. The hydraulic pressure PC1 is obtained by adjusting the hydraulic pressure PL input into the linear solenoid valve SL1 from the mechanically-driven hydraulic pump 14, which serves as the hydraulic pressure source, via the hydraulic circuit 40. Then, the hydraulic pressure PC1 is output from the linear solenoid valve SL1. The prescribed period of time B is empirically set in advance. When the engine speed Ne falls below the prescribed value A before the lapse of the prescribed period of time B, the electrically-driven hydraulic pump abnormality preliminarily determining unit 70 stops calculating the length of time that has elapsed since the rise-up time t2 at which the engine speed Ne has continued to be equal to or higher than the prescribed value A. When the turbine speed Nt has continued to be equal to or higher than the speed D for the period of time $T_D$ from time t3 at which the turbine speed Nt reaches the speed D, which is set in advance to determine whether or not the electrically-driven hydraulic pump 16 has an abnormality, the electrically-driven hydraulic pump abnormality preliminarily determining unit 70 makes a preliminary determination that the electrically-driven hydraulic pump 16 has an abnormality (time t4). The electrically-driven hydraulic pump abnormality preliminarily determining unit 70 turns on the flag, which indicates the result of the preliminary determination, and stores determination history E. The speed D is an example of a first determination value in the invention. The determination history E corresponds to an ON-signal of the electrically-driven hydraulic pump (EOP) abnormality determination, which is turned on immediately after the lapse of the period of time $T_D$ (time t4) in FIG. 4 and FIG. 5.

When the turbine speed Nt increases to be equal to or higher than a prescribed value C after the rise-up time t2 of the engine speed Ne, the linear solenoid valve SL1 abnormality determining unit 72 in the abnormality determining unit 66 determines whether or not the linear solenoid valve SL1 has an abnormality based on the engine speed Ne and turbine speed Nt. More specifically, when the length of time that has elapsed since the rise-up time t2 of the engine speed Ne is equal to or longer than the prescribed period of time B, the linear solenoid valve SL1 abnormality determining unit 72 determines whether or not the turbine speed Nt has continued to be equal to or higher than a linear solenoid valve malfunction determination speed C (rpm), which is the prescribed value C, for a linear solenoid valve SL1 off-abnormality-time racing continuation determination period of time $T_C$ (sec) (hereinafter, referred to as "racing continuation determination period of time Tc". Upon reception of a signal that denies that the engine speed Ne is equal to or higher than the prescribed value A from the engine speed determining unit 68, the linear solenoid valve SL1 abnormality determining unit 72 stops calculating the length of time that has elapsed since the rise-up time t2 at which the engine speed Ne has continued to be equal to or higher than the prescribed value A. The prescribed period of time B is the same as that used in the determination executed by the electrically-driven hydraulic pump abnormality preliminarily determining unit 70. The linear solenoid valve malfunction determination speed C is an example of a second determination value in the invention, and is set higher than the speed D. When the turbine speed Nt has continued to be equal to or higher than the linear solenoid valve malfunction determination speed C for the racing continuation determination period of time Tc, the linear solenoid valve SL1 abnormality determining unit 72 determines that the linear solenoid valve SL1 is malfunctioning. Then, the linear solenoid valve SL1 abnormality determining unit 72 outputs an abnormality output signal, such as light or sound, to indicate that the linear solenoid valve SL1 is malfunctioning.

In the case where the electrically-driven hydraulic pump 16 has an abnormality as illustrated in FIG. 4, when the length of time that has elapsed since the rise-up time t2 of the engine speed Ne is equal to or longer than the prescribed period of time B, the turbine speed Nt does not increase up to the linear solenoid valve malfunction determination speed C, in the racing continuation determination period of time Tc. Thus, the linear solenoid valve SL1 abnormality determining unit determines that the linear solenoid valve SL1 has no OFF-abnormality and maintains an OFF-signal to indicate the result of the OFF-abnormality determination on the linear solenoid valve SL1 in FIG. 4. It is recognized that the first clutch pressure PC1, which is supplied from the linear solenoid valve SL1 in FIG. 4 to engage the first clutch C1 using the hydraulic fluid pressure PL from the mechanically-driven hydraulic oil pump 14 as the source pressure, reaches the engagement pressure high enough for the first clutch C1 to be engaged. In the case where the linear solenoid valve SL1 has an OFF-abnormality as illustrated in FIG. 5, when the length of time that has elapsed since the rise-up time t2 of the engine speed Ne is equal to or longer than the prescribed period of time B, the turbine speed Nt has continued to be equal to or higher than the linear solenoid valve malfunction determination speed C for the racing continuation determination period of time Tc from time t6 at which the turbine speed Nt reaches the linear solenoid valve malfunction determination speed C. Thus, the linear solenoid valve SL1 abnormality determining unit 72 determines that the linear solenoid valve SL1 has an OFF-abnormality (time t7). The OFF-abnormality is an abnormality that the first clutch pressure PC1 does not reach an engagement pressure for the first clutch C1 although the hydraulic fluid pressure PL from the mechanically-driven hydraulic pump 14 is supplied to the linear solenoid valve SL1 and a command to engage the first clutch C1 is issued (at time t7). As illustrated in OFF-abnormality determination on the linear solenoid valve SL1 in FIG. 5, the signal is switched from the OFF-signal indicating that there is no OFF-abnormality to an ON-signal indicating that there is an OFF-abnormality. In FIG. 5, the first clutch pressure PC1 from the linear solenoid valve SL1, which is generated based on the hydraulic fluid pressure PL from the mechanically-driven hydraulic pump 14, does not reach an engagement pressure high enough for the first clutch C1 to be engaged.

When the turbine speed Nt has not continued to be equal to or higher than the linear solenoid valve malfunction determination speed C and the determination history E is stored, the electrically-driven hydraulic pump abnormality determining unit 74 in the abnormality determining unit 66 finally determines that the electrically-driven hydraulic pump 16 is malfunctioning. Specifically, in the case where the linear solenoid valve SL1 abnormality determining unit 72 determines that the turbine speed Nt has not continued to be equal to or higher than the linear solenoid valve malfunction determination speed C when the length of time that has elapsed since the rise-up time t2 of the engine speed Ne is equal to or longer than the prescribed period of time B, the electrically-driven hydraulic pump abnormality determining unit 74 determines that the electrically-driven hydraulic pump 16 is malfunctioning if the determination history E from the electrically-driven hydraulic pump abnormality preliminarily determining unit 70 is stored, and outputs an abnormality output signal to indicate that the electrically-driven hydraulic pump 16 is malfunctioning. On the other hand, when the determination history E is not stored, the electrically-driven hydraulic pump abnormality determining unit 74 determines that all the components are operating properly. In the case where the linear solenoid valve SL1 abnormality determining unit 72 determines that the turbine speed Nt has continued to be equal to or higher than the linear solenoid valve malfunction determination speed C when the length of time that has elapsed since the rise-up time t2 of the engine speed Ne is equal to or longer than the prescribed period of time B, that is, in the case where the linear solenoid valve SL1 abnormality determining unit 72 determines that the linear solenoid valve SL1 is malfunctioning, the electrically-driven hydraulic pump abnormality determining unit 74 switches the determination history E signal from an ON-signal to an OFF-signal after the lapse of the racing continuation determination period of time Tc (at time t7 at which the linear solenoid valve SL1 abnormality determining unit 72 executes the determination) in the electrically-driven hydraulic pump (EOP) abnormality determination, without determining whether or not the determination history E from the electrically-driven hydraulic pump abnormality preliminarily determining unit 70 is stored.

Figure 6:
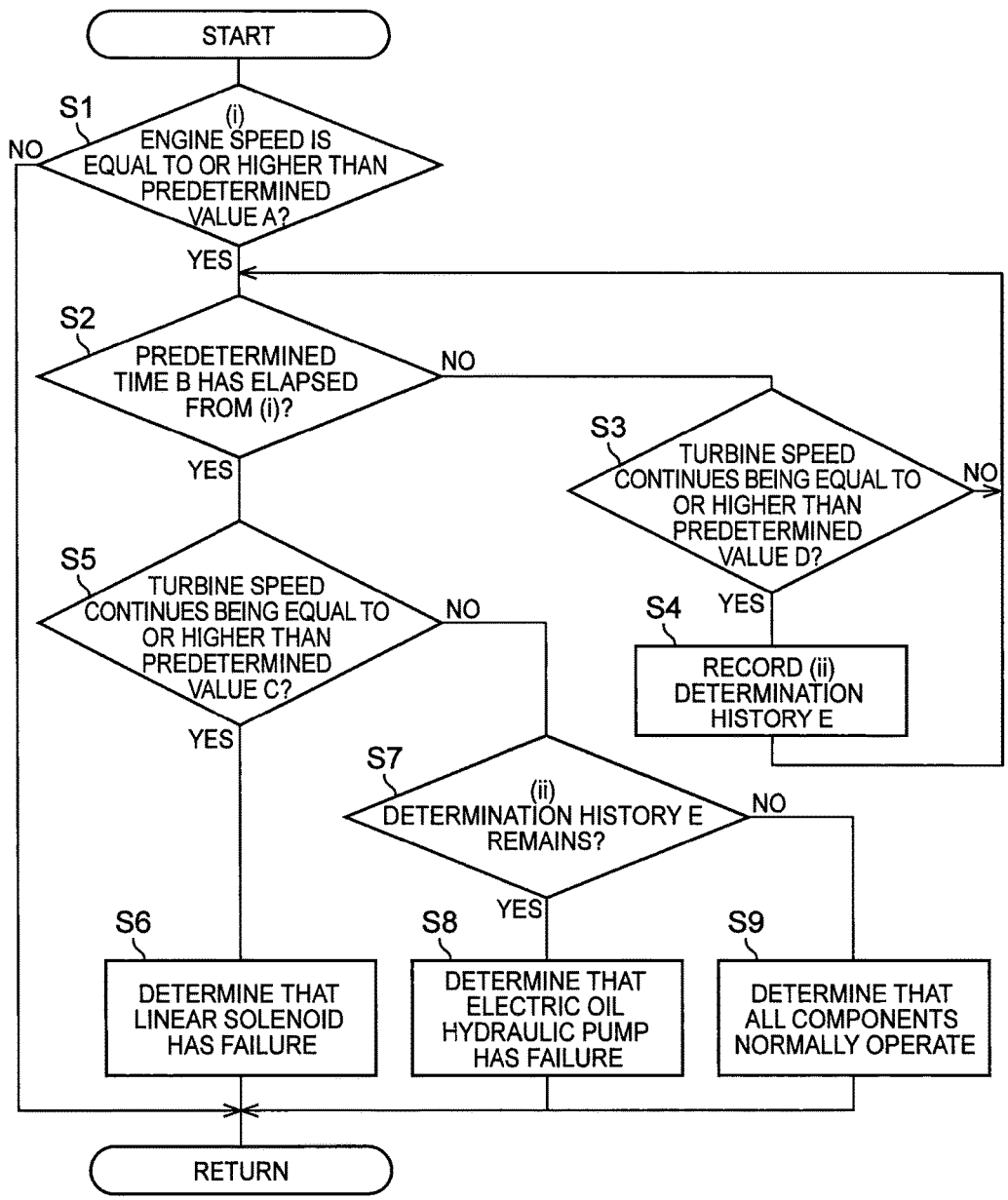
FIG. 6 is a flowchart for illustrating the main portions of the control operation executed by an electronic control unit, that is, the control operation for executing an abnormality determination on the electrically-driven hydraulic pump and the linear solenoid valve.

FIG. 6 is a flowchart for illustrating the main portions of the control operation executed by the electronic control unit 20, that is, the control operation executed by the abnormality determining unit 66 that executes an abnormality determination on the electrically-driven hydraulic pump 16 and the linear solenoid valve SL1. The control operation illustrated in FIG. 6 is periodically executed by itself or in parallel with another control operation.

First, in step S1 (hereinafter, "step" will be omitted) executed by the engine speed determining unit 68, whether or not the engine speed Ne has continued to be equal to or higher than the prescribed value A is determined after restart of the engine 24 (time t1) following the end of automatic stop control. When an affirmative determination is made in S1, S2 is executed. On the other hand, when a negative determination is made in S1, the flowchart ends.

It is determined in S2 whether or not the prescribed period of time B has elapsed since the rise-up time t2 at which it is determined in S1 that the engine speed Ne has continued to be equal to or higher than the prescribed value A. The prescribed period of time B is a predetermined period of time required for the discharge pressure from the mechanically-driven hydraulic pump 14 driven by the engine 24 to reach an engagement pressure high enough for the first clutch C1 to be engaged. When a negative determination is made in S2, S3 is executed. On the other hand, when an affirmative determination is made in S2, S5 is executed.

It is determined in S3 whether or not the turbine speed Nt has continued to be equal to or higher than the speed D when the length of time that has elapsed since the rise-up time t2, at which the engine speed Ne has continued to be equal to or higher than the prescribed value A, is shorter than the prescribed period of time B. Specifically, it is determined whether or not the turbine speed Nt has continued to be equal to or higher than the speed D for the period of time $T_D$ from time t3, at which the turbine speed Nt reaches the speed D. When an affirmative determination is made in S3, S4 is executed. On the other hand, when a negative determination is made in S3, S2 is executed again.

In S4, at time t4 at which the period of time $T_D$ has elapsed since time t3, a preliminary determination that the electrically-driven hydraulic pump 16 has an abnormality is made, and the determination history E is stored. After S4 is executed, S2 is executed again. S2 to S4 are executed by the electrically-driven hydraulic pump abnormality preliminarily determining unit 70.

It is determined in S5 whether or not the turbine speed Nt has continued to be equal to or higher than the SL1 malfunction determination speed C when the length of time that has elapsed since the rise-up time t2, at which the engine speed Ne has continued to be equal to or higher than the prescribed value A, is equal to or longer than the prescribed period of time B. Specifically, it is determined whether or not the turbine speed Nt has continued to be equal to or higher than the SL1 malfunction determination speed C for the racing continuation determination period of time $T_C$ from time t6, at which the turbine speed Nt reaches the linear solenoid valve malfunction determination speed C. When an affirmative determination is made in S5, S6 is executed. On the other hand, when a negative determination is made in S5, S7 is executed.

It is determined in S6 that the linear solenoid valve SL1 is malfunctioning, at time t7, at which the racing continuation determination period of time $T_C$ has elapsed since time t6. Based on the abnormality determination on the linear solenoid valve SL1, an abnormality output signal, such as light or sound, is output. After S6 is executed, the flowchart ends. S2, S5 and S6 are executed by the linear solenoid valve SL1 abnormality determining unit 72.

When the turbine speed Nt does not increase up to the linear solenoid valve malfunction determination speed C when the length of time that has elapsed since the rise-up time t2 of the engine speed Ne is equal to or longer than the prescribed period of time B, it is determined in S7 whether or not the determination history E is stored. In other words, it is determined whether or not a preliminary determination that the electrically-driven hydraulic pump 16 has an abnormality is made. When an affirmative determination is made in S7, S8 is executed. On the other hand, when a negative determination is made in S7, S9 is executed.

It is determined in S8 that the electrically-driven hydraulic pump 16 is malfunctioning. Based on the abnormality determination on the electrically-driven hydraulic pump 16, an abnormality output signal, such as light or sound, is output. After S8 is executed, the flowchart ends.

It is determined in S9 that all the components are operating properly. After S9 is executed, the flowchart ends. S7 to S9 are executed by the electrically-driven hydraulic pump abnormality determining unit 74.

As described above, the electronic control unit 20 according to the present embodiment determines that the electrically-driven hydraulic pump 16 has an abnormality, based on the fact that the turbine speed Nt of the torque converter 30 has continued to be equal to or higher than the speed D when the length of time that has elapsed since the rise-up time (time t2 in FIG. 4 and FIG. 5), at which the engine speed Ne of the engine 24 has continued to be equal to or higher than the prescribed value A, is shorter than the prescribed period of time B. The electronic control unit 20 determines that the linear solenoid valve SL1 has an abnormality, based on the fact that the turbine speed Nt has continued to be equal to or higher than the linear solenoid valve malfunction determination speed C, which is higher than the speed D, when the length of time that has elapsed since the rise-up time t2 is equal to or longer than the prescribed period of time B. Thus, it is possible to identify which of the electrically-driven hydraulic pump 16 and the linear solenoid valve SL1 is malfunctioning, without increasing the number of components.

In the vehicle 8 including the electronic control unit 20 according to the present embodiment, starting of the engine 24 is a restart after the end of the automatic stop control for automatically stopping the engine 24 when the vehicle 8 stops moving. Thus, it is possible to identify which of the electrically-driven hydraulic pump 16 and the linear solenoid valve SL1 is malfunctioning each time a prescribed period of time elapses after the restart of the engine 24 following the end of the automatic stop control.

In the vehicle 8 including the electronic control unit 20 according to the present embodiment, the electrically-driven hydraulic pump 16 and the linear solenoid valve SL1 are operated to engage the first clutch C1 at least during starting of the engine 24. Thus, during starting of the engine 24, which is a period during which the discharge pressure from the mechanically-driven hydraulic pump 14 driven by the engine 24 is not sufficiently high as the source pressure for controlling the operation of the first clutch C1, the discharge pressure from the electrically-driven hydraulic pump 16 that is electrically driven is supplied to the linear solenoid valve SL1, as the source pressure for engaging the first clutch C1. Thus, whether or not the electrically-driven hydraulic pump 16 has an abnormality is determined, based on whether or not the turbine speed Nt of the torque converter 30 has continued to be equal to or higher than the speed D when the length of time that has elapsed since the rise-up time, at which the engine speed Ne of the engine 24 has continued to be equal to or higher than the prescribed value A, is shorter than the prescribed period of time B.

In the vehicle 8 including the electronic control unit 20 in the present embodiment, the prescribed period of time B is a predetermined period of time required for the discharge pressure from the mechanically-driven hydraulic pump 14 driven by the engine 24 to reach an engagement pressure high enough for the first clutch C1 to be engaged, from the rise-up time t2 at which the speed Ne of the engine 24 has continued to be equal to or higher than the prescribed value A. Thus, within a period of time from the rise-up time t2, at which the speed Ne of the engine 24 has continued to be equal to or higher than the prescribed value A, to a time at which the first clutch C1 is allowed be engaged only by the discharged pressure from the mechanically-driven hydraulic pump 14, it is determined whether or not the electrically-driven hydraulic pump 16 has an abnormality based on whether or not the turbine speed Nt has continued to be equal to or higher than the speed D. Thus, it is possible to enhance the accuracy of determination as to whether the electrically-driven hydraulic pump 16 has an abnormality.

In the vehicle 8 including the electronic control unit 20 according to the present embodiment, the first clutch C1 is a starting clutch to be engaged to achieve first gear of the automatic transmission 26. Thus, when any one of the electrically-driven hydraulic pump 16, which serves as a hydraulic pressure source of engagement pressure for engaging the first clutch C1, and the linear solenoid valve SL1, which controls the operation of the first clutch C1 using the discharge pressures from the electrically-driven hydraulic pump 16 and the mechanically-driven hydraulic pump 14 as the source pressures, is malfunctioning, first gear of the automatic transmission 26 is not achieved. As a result, the engine output torque Te is not transmitted to the automatic transmission 26 via the turbine shaft 32. This causes the turbine speed Nt of the torque converter 30 to abnormally increase (i.e., this causes racing of the turbine). Thus, it is possible to identify which of the electrically-driven hydraulic pump 16 and the linear solenoid valve SL1 is malfunctioning based on the turbine speed Nt.

Next, a second embodiment of the invention will be described. In the second embodiment, the elements having substantially the same functions as those in the first embodiment will be denoted by the same reference symbols as those in the first embodiment.

Figure 7:
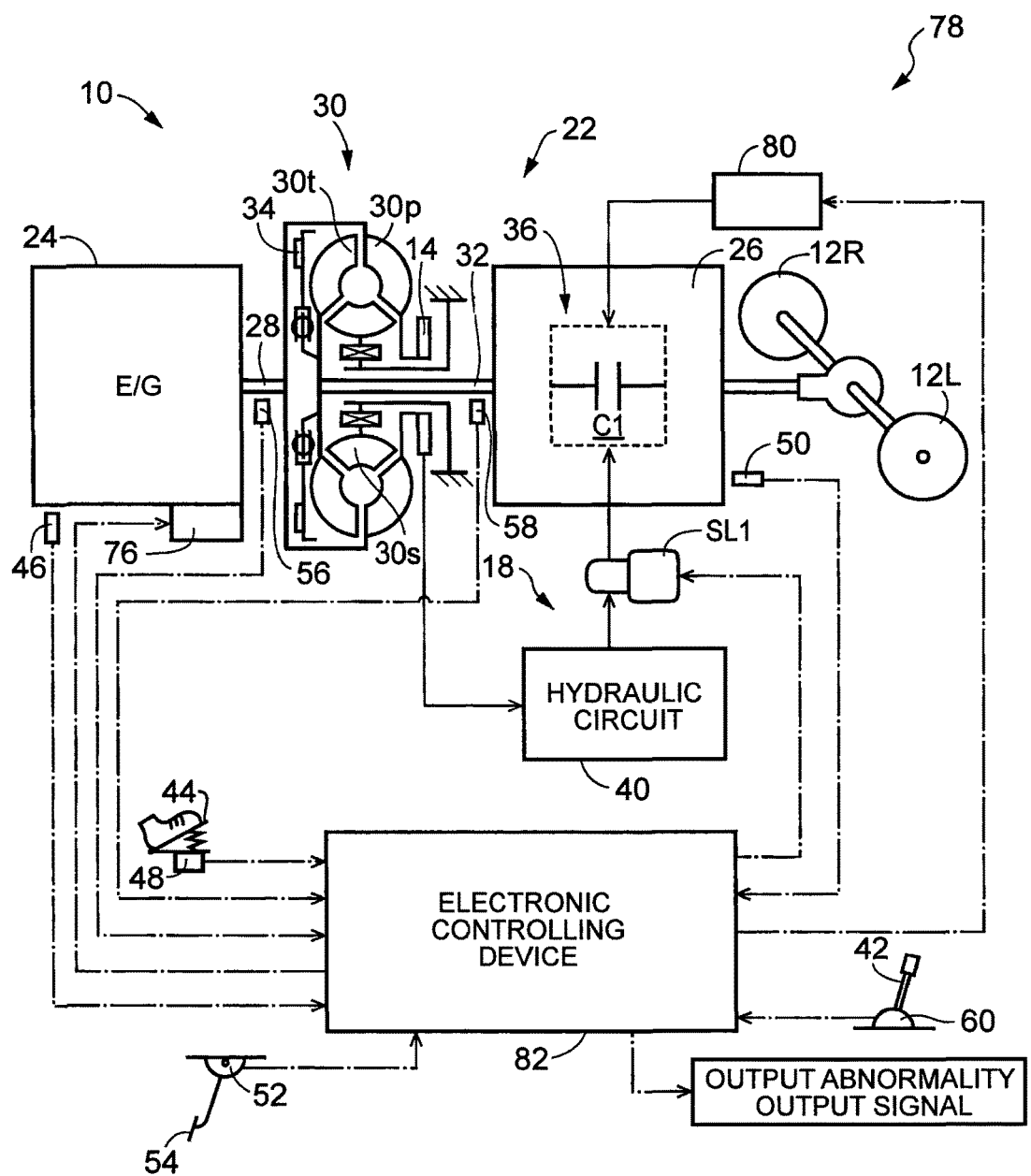
FIG. 7 is a schematic diagram of a vehicle driving apparatus in a second embodiment of the invention.

An electrically-driven hydraulic pump may be a hydraulic pump equipped with an electric motor, which includes an electric motor and a hydraulic pump driven by the electronic motor. Alternatively, an electrically-driven hydraulic pump may be an electromagnetic hydraulic pump including an electromagnet and a plunger pump repeatedly reciprocated by the electromagnet. In the electromagnetic hydraulic pump, the plunger pump is driven at a prescribed frequency by an electromagnet operated on alternate-current. The output pressure from the electromagnetic pump is directly supplied to the hydraulic clutch. FIG. 7 is a schematic diagram of a vehicle driving apparatus 10 included in a vehicle 78 according to the second embodiment of the invention. The vehicle 78 in the present embodiment includes an electromagnetic hydraulic pump 80, which is an example of an electrically-driven hydraulic pump in the invention, and an electronic control unit 82 that controls the operation of the electromagnetic hydraulic pump 80. The electromagnetic hydraulic pump 80 may also be referred to as an electromagnetic valve hydraulic pump. The electromagnetic hydraulic pump 80 includes an electromagnetic actuator and a plunger pump that is driven at a prescribed frequency by the electromagnetic actuator. The output pressure from the electromagnetic hydraulic pump 80 is directly supplied to the first clutch C1.

The electronic control unit 82 includes a determining unit 62 and an automatic stop control unit 64 that control the automatic stop of the vehicle 78. The electronic control unit 82, which functions as an abnormality determining apparatus according to the invention, includes an abnormality determining unit 66 that determines whether or not there is an abnormality in the power transmission state during starting of the engine, for example, during a restart of the engine after the end of the automatic stop control.

When the determining unit 62 determines that the automatic stop controlling condition is satisfied, the automatic stop control unit 64 drives the electromagnetic hydraulic pump 80 to maintain the first clutch pressure PC1 at an engagement pressure high enough for the first clutch C1 to be engaged. The automatic stop control unit 64 drives the electromagnetic hydraulic pump 80 to maintain an engagement pressure high enough for the first clutch C1 to be engaged to achieve first gear of the automatic transmission 26, when the following conditions i) to iii) are all satisfied; i) a condition that the determining unit 62 determines that the automatic stop condition, which has been satisfied, is no longer satisfied, ii) a condition that the engine 24 is being started, and iii) a condition that the linear solenoid valve SL1 has not become able to supply an engagement pressure high enough for the first clutch C1 to be engaged, using the hydraulic fluid pressure PL from the mechanically-driven hydraulic pump 14 as the source pressure. In this case, starting of the engine 24 means a restart of the engine 24, that is, starting of the engine 24 after the end of the automatic stop control.

When the length of time that has elapsed since the rise-up time of the engine speed N2 is shorter than the prescribed period of time B, the electromagnetic hydraulic pump abnormality preliminarily determining unit 70 determines whether or not the turbine speed Nt has continued to be equal to or higher than the speed D for the period of time $T_D$. The rise-up time is a time point at which the engine speed Ne has continued to be equal to or higher than the prescribed value A. The period of time $T_D$ is used to determine whether or not racing of the turbine due to an abnormality in the electromagnetic hydraulic pump continues. The speed D is used as an empirically determined threshold used to determine whether or not racing of the turbine due to an abnormality in the electromagnetic hydraulic pump continues. When the turbine speed Nt has continued to be equal to or higher than the speed D for the period of time $T_D$, the electromagnetic hydraulic pump abnormality preliminarily determining unit 70 makes a preliminary determination that the electromagnetic hydraulic pump 80 has an abnormality, and stores determination history E.

When the electromagnetic hydraulic pump abnormality determining unit 74 receives, from the linear solenoid valve SL1 abnormality determining unit 72, a signal indicating that the turbine speed Nt has not continued to be equal to or higher than the speed C when the length of time that has elapsed since the rise-up time of the engine speed N2 is equal to or longer than the prescribed period of time B, the electromagnetic hydraulic pump abnormality determining unit 74 determines whether or not the determination history E prepared by the electromagnetic hydraulic pump abnormality preliminarily determining unit 70 is stored. When the determination history E is stored, the electromagnetic hydraulic pump abnormality determining unit 74 determines that the electromagnetic hydraulic pump 80 is malfunctioning, and outputs an abnormality output signal, such as light or sound, to indicate that the electromagnetic hydraulic pump 80 is malfunctioning. On the other hand, when the determination history E is not stored, the electromagnetic hydraulic pump abnormality determining unit 74 denies the possibility of a malfunction of the electromagnetic hydraulic pump 80, and determines that all the components are operating properly.

As described above, the electronic control unit 82 according to the present embodiment provides the same effects as those in the first embodiment.

In the vehicle 78 including the electronic control unit 82 in the present embodiment, the electrically-driven hydraulic pump is the electromagnetic hydraulic pump 80 that includes the electromagnet and the plunger pump repeatedly reciprocated by the electromagnet. In the electromagnetic hydraulic pump 80, the plunger pump is driven at a prescribed frequency by the electromagnet operated on alternate-current. The output pressure from the electromagnetic hydraulic pump 80 is directly supplied to the first clutch C1. In a vehicle hydraulic circuit configured as described above, after the automatic stop control ends, the engine 24 is restarted to allow the vehicle 78 to start travelling. Thus, it is possible to identify which of the electromagnetic hydraulic pump 80 and the linear solenoid valve SL1 is malfunctioning, each time a prescribed period of time elapses after the restart of the engine 24 following the end of the automatic stop control.

While the embodiments of the invention have been described in detail with reference to the tables and the drawings, the invention may be implemented in various other embodiments obtained by making various modifications to the above-described embodiments within the scope of the invention.

In each of the vehicle 8 in the first embodiment and the vehicle 78 in the second embodiment, the abnormality determination on the vehicle hydraulic circuit is executed within a prescribed period of time after the restart of the engine following the end of automatic stop control. However, the abnormality determination should not be limited to this. For example, the abnormality determination on the vehicle hydraulic circuit may be executed when the engine which has been completely stopped is started.

In each of the first embodiment and the second embodiment, when the automatic stop control condition is satisfied, the linear solenoid valve SL1 is driven to adjust the first clutch pressure PC1 to an engagement pressure high enough for the first clutch C1 to be engaged. Alternatively, the linear solenoid valve SL1 may be driven to regulate the first clutch pressure PC1 to a pressure a slightly higher than a pressure for packing of the first clutch C1 (packing means an operation for placing an engagement device in a stand-by state that is immediately before the engaged state, by adjusting the hydraulic pressure of a hydraulic pressure chamber).

Each of the above-described embodiments is merely one example embodiment of the invention, and the invention may be implemented in various other embodiments obtained by making various modifications and improvements to the above-described embodiments within the scope of the invention, based on the knowledge of a person skilled in the art.

What is claimed is:

1. An abnormality determining apparatus for a hydraulic circuit of a vehicle, the vehicle including:
   a torque converter disposed between an engine and an automatic transmission;
   a hydraulic clutch disposed in the automatic transmission;
   a mechanically-driven hydraulic pump driven by the engine;
   an electrically-driven hydraulic pump; and
   a solenoid valve configured to control operation of the hydraulic clutch using discharge pressures from the mechanically-driven hydraulic pump and the electrically-driven hydraulic pump as source pressures, or using a discharge pressure from the mechanically-driven hydraulic pump as a source pressure,
   the abnormality determining apparatus comprising:
      an electronic control unit configured to:
         determine which of the electrically-driven hydraulic pump and the solenoid valve has an abnormality,
         determine that the electrically-driven hydraulic pump has an abnormality when a turbine speed of the torque converter becomes equal to or higher than a first determination value within a prescribed period of time from rise-up of a speed of the engine, and
         determine that the solenoid valve has an abnormality when the turbine speed becomes equal to or higher than a second determination value that is higher than the first determination value, after a lapse of the prescribed period of time.

2. The abnormality determining apparatus according to claim 1,
   wherein starting of the engine is a restart of the engine after automatic stop control ends, and
   the automatic stop control is control of automatically stopping the engine when the vehicle stops moving.

3. The abnormality determining apparatus according to claim 1,
   wherein the electrically-driven hydraulic pump and the solenoid valve are operated to engage the hydraulic clutch at least during starting of the engine.

4. The abnormality determining apparatus according to claim 1,
   wherein the prescribed period of time is a predetermined period of time required for a discharge pressure from the mechanically-driven hydraulic pump to reach an engagement pressure high enough for the hydraulic clutch to be engaged.

5. The abnormality determining apparatus according to claim 1,
   wherein the hydraulic clutch is a starting clutch to be engaged to achieve first gear of the automatic transmission.

6. The abnormality determining apparatus according to claim 1,
   wherein the electrically-driven hydraulic pump includes an electromagnetic valve that adjusts an output pressure and the output pressure is directly supplied to the hydraulic clutch.

* * * * *